Figure 1:
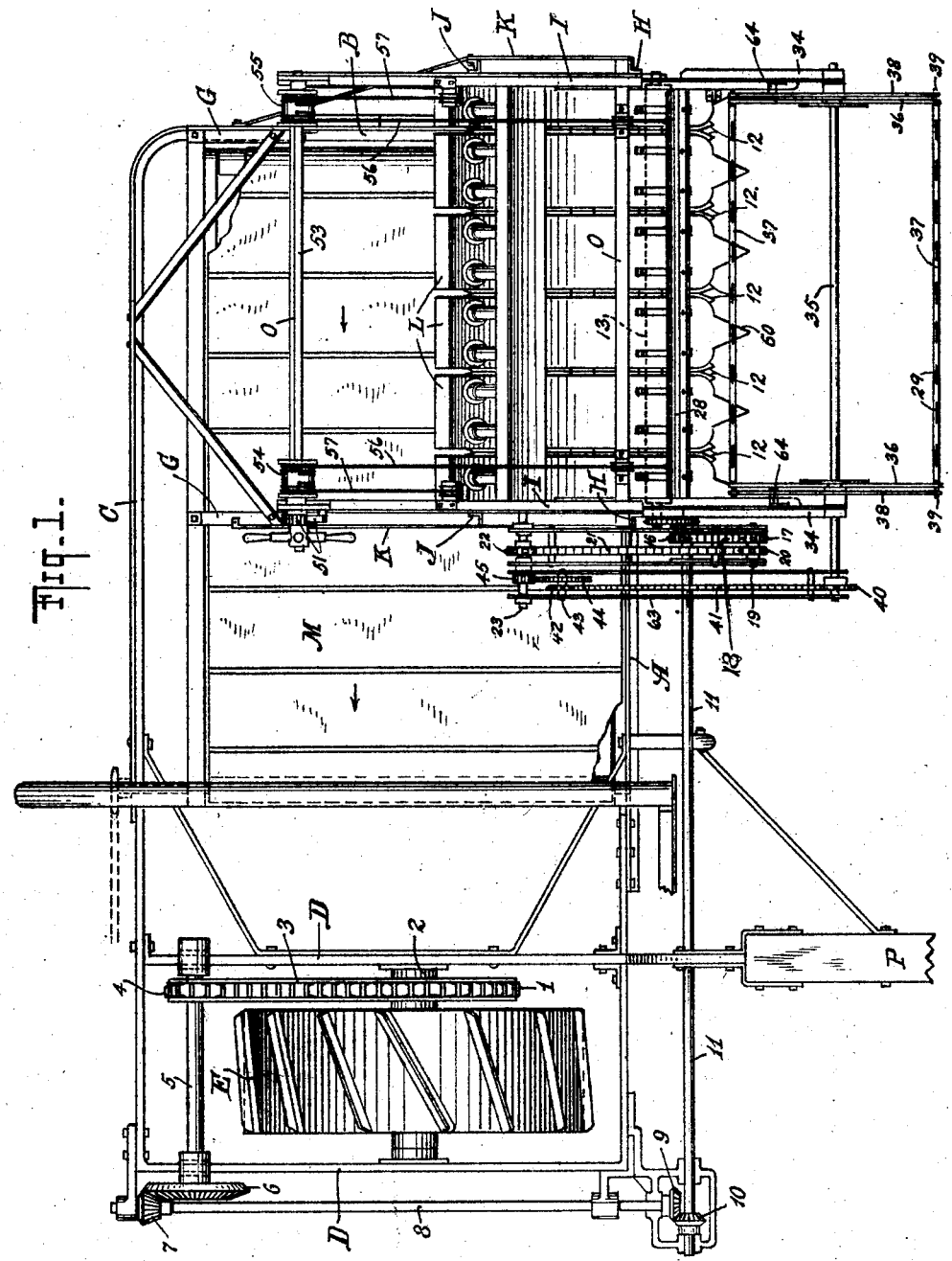

May 5, 1925.

E. PUSCH

FLAX PULLER

Filed Jan. 24, 1922 4 Sheets-Sheet 1

1,536,455

WITNESS
G. V. Rasmussen

INVENTOR
EMIL PUSCH
BY
ATTORNEYS

May 5, 1925.
E. PUSCH
FLAX PULLER
Filed Jan. 24, 1922
1,536,455
4 Sheets-Sheet 2
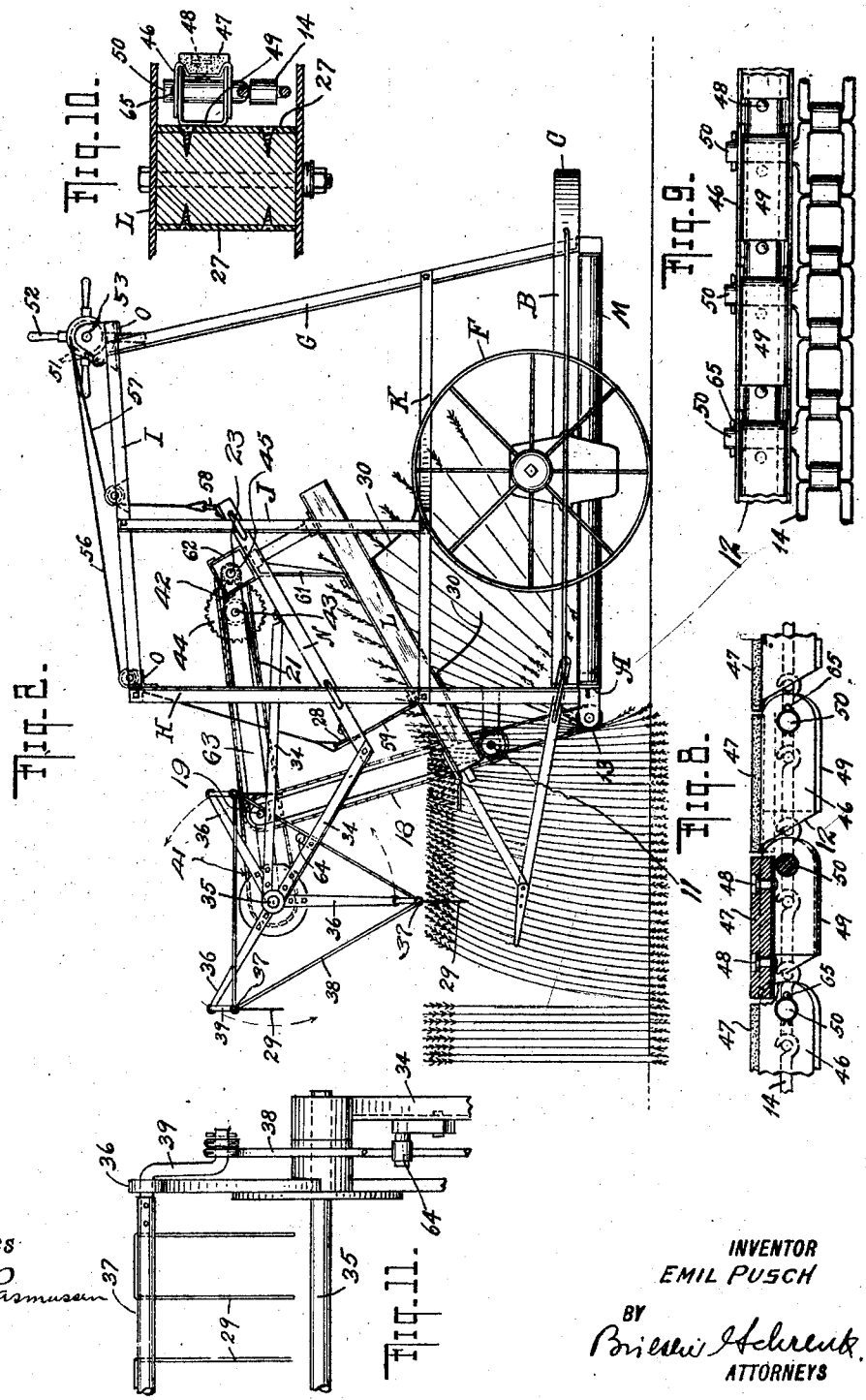
WITNESS
G. V. Rasmussen
INVENTOR
EMIL PUSCH
BY
ATTORNEYS May 5, 1925.
E. PUSCH
FLAX PULLER
Filed Jan. 24, 1922    4 Sheets-Sheet 3
1,536,455
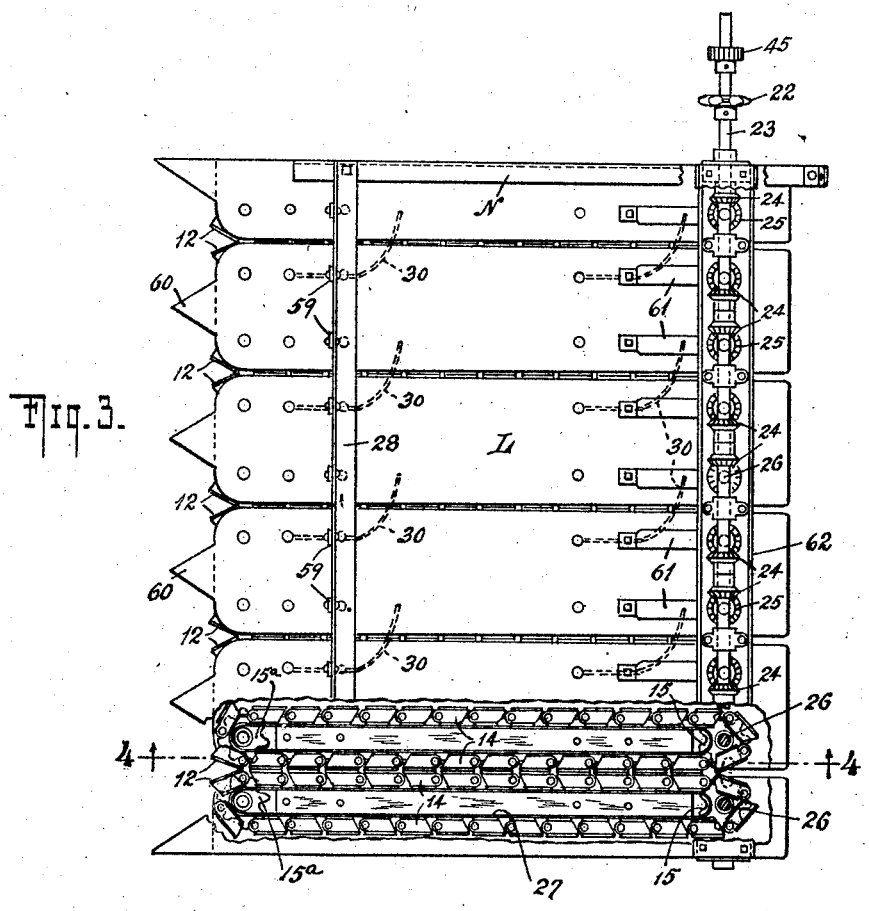
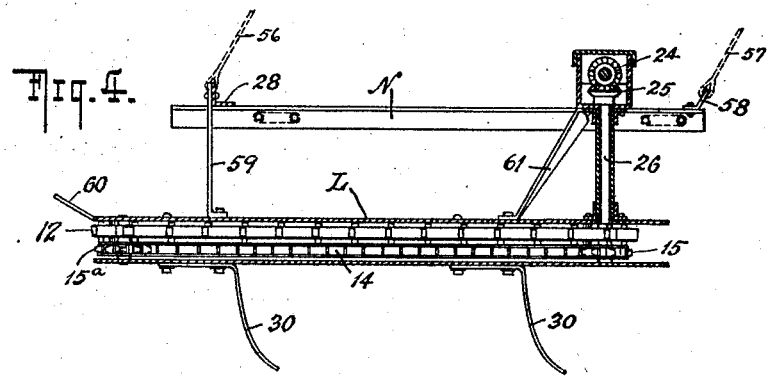
WITNESS
G. V. Rasmussen
INVENTOR
EMIL PUSCH
BY
Nielsen Schenck
ATTORNEYS

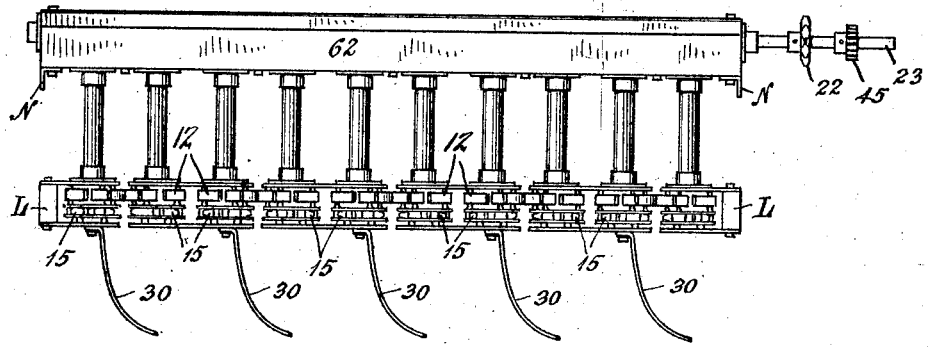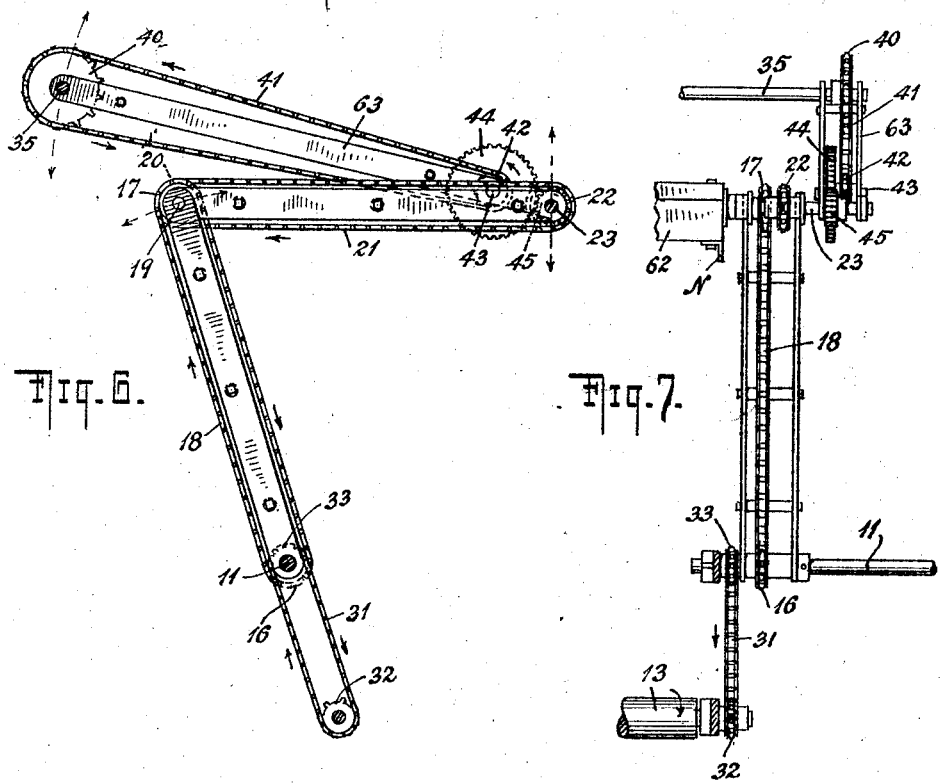

Patented May 5, 1925.

1,536,455

UNITED STATES PATENT OFFICE.

EMIL PUSCH, OF NEW ROCHELLE, NEW YORK.

FLAX PULLER.

Application filed January 24, 1922. Serial No. 531,334.

*To all whom it may concern:*

Be it known that I, EMIL PUSCH, a citizen of the United States, residing at New Rochelle, in the State of New York, have invented certain new and useful Improvements in Flax Pullers, of which the following is a specification.

This invention relates to a machine for pulling flax plants while standing in the field. The plants, after having been pulled, are deposited on a moving belt, which conveys them to a suitable binder or knotter.

The object of the invention is to pull the plants, with the roots, from the field by force applied at two different places on each plant. The mechanism of the machine is adjustable so that it will operate efficiently with plants of different heights. The machine of this invention will pull flax in a green state and also when fully ripened and avoids harvesting with the flax a great portion of the weeds growing in the flax field.

In the drawings Fig. 1 represents a plan view of the device, Fig. 2 represents a side elevation taken from the right end of Fig. 1. Fig. 3 represents a horizontal plan view of the bed of the device with cover plates broken away to show the grasping devices. Fig. 4 represents a sectional elevation taken on the line 4—4 of Fig. 3. Fig. 5 represents an elevation taken from the rear of Fig. 2. Fig. 6 represents an enlarged detail view of the driving mechanism illustrated in Fig. 2. Fig. 7 represents a rear elevation of Fig. 6. Fig. 8 represents an enlarged detail plan of an endless chain and grasping devices. Fig. 9 represents an elevation of Fig. 8. Fig. 10 represents a vertical cross section of a portion of the track and a grasping device. Fig. 11 represents an enlarged detail of one end of the rake operating mechanism.

The frame of the machine comprises the side and end pieces A, B, C and D. The main driving wheel E is mounted in a suitable supplemental frame secured in the main frame and is utilized for transmitting power to the operating parts of the flax puller as the device is drawn over the field. The idle wheel F is suitably mounted in the frame in the right side thereof and supports that side of the puller. The pulling apparatus is mounted at the right side of the frame, leaving sufficient space at the center of the device for mounting a suitable binder or knotter.

Power is transmitted from the main driving wheel to the operating parts of the puller by means of the sprocket wheel 1 secured to the axle 2 of the main driving wheel E, the sprocket chain 3 co-operating with the sprocket wheel 4 mounted on the shaft 5 which carries at the opposite end the beveled gear 6 engaging the beveled gear 7. The beveled gear 7 is secured to drive the shaft 8 and transmits motion thereto. The bevel gear 9 is mounted at the opposite end of the shaft 8 and engages with and drives the beveled gear 10 mounted on the main drive shaft 11 through which main shaft 11 power is transmitted to the pulling mechanism.

The chief elements of the pulling mechanism are the grasping devices 12, which are mounted in the frame L, and co-operate in pairs to grasp the standing plants just below the lowermost flower or seed stems and the bar or roller 13 which comes in contact with the standing flax stalks at a slight elevation from the ground. The grasping devices 12, acting in conjunction in pairs, take hold of the flax plants and draw them upwardly and rearwardly of the machine and while the plants are being thus drawn by the grasping devices the bar or roller 13 is moved against the stalks near the ground by the forward movement of the entire puller, and pushes or lifts against the stems whereby the plants are drawn or forced from the ground.

The grasping devices 12 are mounted on endless belts which, by way of example, are shown in the form of sprocket chains 14 in such a manner that one end of each device is pivotally connected with said chains and the other end thereof is free and disconnected so that each device 12 is capable of an independent pivotal movement relatively to the chain on which it is mounted, said chains running on the sprocket wheels 15 and 15ᵃ (Fig. 3). The sprocket wheels 15, driven through a series of mechanisms from the main shaft 11, drive the endless sprocket chains 14. The mechanism for driving the sprocket 15, commencing at the main shaft 11, comprises the following: (Figs. 1, 2, 6 and 7) Driving shaft 11 has secured to it the sprocket wheel 16, which by the sprocket chain 18 drives the sprocket wheel 17 mounted on the shaft 19. The driven shaft 19 drives the sprocket wheel 20, which in turn drives the sprocket chain 21 and sprocket 22. Motion is transmitted by the sprocket wheel 22 to the shaft 23, which in turn drives the intermeshing beveled gears 24 and 25. Each gear 25 is mounted on a shaft 26 (Fig. 4) and each of said shafts 26 has a sprocket wheel 15 secured thereto opposite to the beveled gear 25 whereby motion is transmitted to each sprocket chain 14, carrying the grasping devices 12. As shown in Fig. 3, two adjacent endless sprocket chains 14 with their respective grasping devices, constitute a set of pulling devices. As many sets of pulling devices may be incorporated in the machine as considered practical and to illustrate the device five sets are shown in Fig. 3.

The two co-operating grasping devices 12, as they swing around the idle sprocket wheel 15ª describe independent pivotal movements relatively to the chains 14 whereby the free ends of co-operating devices on each chain approach each other and as the approach parallel relation the inner faces gradually come into contact while the outer surfaces contact with the track 27 which presses the grasping devices together. While the two companion grasping devices, approaching the track 27, are still open, the rake 29, which is moving through the flax, pushes the plants between the open devices 12 and they thereupon gradually close until they have taken a firm hold upon a plurality of the plants. The grasping devices 12 retain hold of the plants during the entire movement along the track 27 and in an upward direction in relation to the field. It will be evident that the grasping devices during their upward travel pull upon the flax plants and tend to lift them from the soil. While the flax plants are in the grasp of the devices 12 the bar or roller 13, moving forwardly as the machine is being drawn through the flax field, pushes or lifts against the stems of the plant (in proximity to the soil) and assists in pulling the plants. After the plants are removed from the soil by the co-operation of the grasping devices 12 and the roller 13, the grasping devices carry the plants rearwardly of the machine and toward the conveyor M. A series of curved wire guides 30 are secured to the under side of the frame L. The butt ends of the plants come in contact with the inclined guides 30 and slide downwardly and sidewardly thereon and finally fall upon the conveyor. The grasping devices open as they commence to turn on the sprocket wheels 15 and describe independent pivotal movements relatively to the chains 14 in such a manner as to cause the free ends of each co-operating pair of devices to move outwardly and to exert a throwing action whereby the plants are released and the heads thereof also fall upon the conveyor M. The conveyor M carries the plants to the binder or knotter.

It is preferred to revolve the bar or roller 13 so that it shall have a tendency to lift the flat plants toward the grasping devices 12. The bar or roller 13 is driven from the main shaft 11 by the sprocket wheel 33 secured to the shaft 11, the sprocket chain 31 meshing with the sprocket wheels 33 and 32, the latter being secured to the bar or roller 13. The rakes 29 are suspended over the flax from the frame N which is secured to the frame L by means of the brackets 59 riveted to the angle iron 28 and by the brackets 61 which are secured on their upper ends to the gear box 62.

The frame L carrying the grasping devices 12 and the driving mechanism therefor is slidably arranged in the machine so that the grasping device may be adjusted toward and away from the flax. The main frame of the device has secured thereto the upright bars G, G, H, H, and the horizontal bars I, I. The horizontal angle irons I, I and O, O connect the upright bars G, G and H, H. Short upright angle irons J, J, intermediate the bars H, G, are secured to the horizontal angle irons I, K. The two sets of bars H, J constitute guides on rails on which the frames L and N are slidably mounted. The rakes are so adjusted as to reach into the flax and move the plants into the grasping devices 12. The bracket arms 34 are secured to the bar N and to the extreme ends of which arms 34 is secured the shaft 35 from which shaft the three arms 36 radiate. The pipe shafts 37, carrying the rakes 29, are mounted on the radiating arms 36 by means of the cranks 39 secured to the opposite ends of the shafts 37. The rods 38 are secured to the end of the crank arms 39. To retain the rakes in proper alignment during movement through the flax, the rollers 64 are mounted on the lower bracket 34, abutting against one of the arms 38 as shown in Figs. 1, 2 and 11. The arms 36 revolve with the shaft 35 which receives power through the sprocket wheel 40, sprocket chain 41 and sprocket wheel 42, mounted on shaft 43. The shaft 43 has secured thereto the large gear wheel 44 meshing with the small gear wheel 45 mounted on the shaft 23, which shaft also carries the sprocket wheel 42. The shaft 43 is mounted in the arms 63 which arms are mounted on the shaft 23. Each of the grasping devices 12 comprises a U-shaped sheet metal frame 46 (Fig. 10) recessed to receive therein a substantially hard but resilient rubber facing 47 secured to frame 46 by counter-sunk rivets 48. The rear of the frame 46 is closed by a U-shaped metallic frame 49, the sides whereof telescope into and fit against the inner side of the frame 46. The frames 46 and 49 are suitably perforated, so that each grasping device 12 may be mounted upon a pin 50, constituting a part of the endless chain 14 and held thereon by the cotter pin 65. The exposed surface of each frame 49 comes in contact with the track 27 as best illustrated in Fig. 10.

The frames L and N are adjustable toward and away from the flax plants by rotating the spoked wheel 52, secured to the shaft 53 and are held from reverse rotation by the ratchet and pawl 51. The drums 54 and 55 are secured to the opposite ends of the shaft 53. The cables 56 and 57 are secured to the drums 54 and 55 and to the angle iron 28 and brackets 58, respectively, whereby the mechanism carried by the frames L and N may be adjusted toward and away from the flax plants depending upon their height.

A seat for the driver or operator may be secured to the machine in proximity to the wheel 52 and a draw pole P may be secured to the main frame as shown in Fig. 1.

The operation of the device is as follows: As the puller is drawn into the flax field the revolving rakes move the flax toward the grasping devices 12 which close upon the flax plants as the rear surface of each grasping device comes in contact with the track 27. The adjacent resilient rubber surface 47 of the grasping devices takes hold of the plants but without crushing them. The rearward and upward movement of the grasping devices exert a gradual pull upon the plants and while the plants are subject to the pull of the grasping devices the bar or roller 13 pushes or lifts against the plants in the region of the soil and assists in pulling the plants therefrom. The plants are carried rearwardly and upwardly by the grasping devices and during the rearward movement the butt end of the plants slides downwardly and sidewardly on the inclined guides 30. With the grasping devices open, the plants are dropped on the conveyor and carried toward the knotter or binder.

What I claim is:

1. In a flax puller, in combination, a frame, grasping means mounted thereon adapted to grasp flax plants and exert a pulling force thereon and means positioned below said grasping means adapted to exert a pulling pressure upon the flax plants and adapted in conjunction with said grasping devices to remove the flax plants from the soil.

2. In a flax puller, in combination, grasping devices mounted thereon, said grasping devices being adapted to grasp flax plants and exert a pulling force thereon, revolving means positioned below said grasping devices adapted to move against the butt ends of the flax plants held by said grasping devices and exert a pulling pressure thereon, whereby the flax plants are removed from the soil.

3. In a flax puller, in combination, two series of independent grasping devices, the grasping devices of each series moving successively in a continuous and predetermined path, the grasping devices of each series being adapted to co-act in pairs to grasp the flax plants and during their movement in said predetermined paths to exert a pulling pressure thereon and means spaced below said grasping devices adapted to push against the flax plants.

4. In a flax puller, in combination, a frame, two endless chains mounted thereon co-acting grasping devices pivotally mounted on said chains, the grasping devices of each chain being adapted to move successively in a continuous and predetermined path, corresponding grasping devices of each chain being adapted to describe independent pivotal movements relatively to said chains and thereby come together in surface engagement in proximity to the forward portion of the puller and grasp the flax plants between them and draw the plants rearwardly of the puller and in proximity to the rear end of the puller to pivotally move apart and independently of and relatively to said chains and thereby release the plants after they have been pulled from the soil.

5. In a flax puller, in combination, a series of endless chains mounted thereon, a series of independent grasping devices pivotally mounted on each endless chain and adapted to move with said endless chain in predetermined paths, the grasping devices on two adjacent endless chains being adapted, while moving in their respective paths, to describe independent pivotal movements relatively to said chains and thereby come together into surface engagement in co-operating pairs, means for retaining said grasping devices in such relation during movement through a part of the respective paths and means to drive said endless chains.

6. In a flax puller, in combination, a series of endless chains mounted thereon adapted to move in predetermined paths, means to drive said endless chains, a series of independent grasping devices pivotally mounted on each endless chain and adapted to move with the respective chains whereon said grasping devices are mounted, each grasping device having resilient facing, corresponding grasping devices on adjacent endless chains being adapted to describe independent pivotal movements relatively to said chains and thereby come together into surface engagement in co-operating pairs, means for pressing adjacent grasping devices together during part of their movement through a portion of their respective paths and means to separate contacting grasping devices, 7. In a flax puller, in combination, a series of endless chains adapted to move in predetermined paths, a series of independent grasping devices pivotally mounted upon each endless chain and adapted to move in said predetermined path with their respective endless chains and a track in proximity to a portion of the respective paths in which the respective endless chains and grasping devices move, each grasping device describing an independent pivotal movement relatively to its chain and contacting successively with its respective track and being thereby pressed against a co-operating grasping device upon an adjacent chain.

8. In a flax puller, in combination, a plurality of moving belts and a plurality of independent grasping devices carried by and movable with said belts and further being capable of movement independently thereof, the grasping devices of each belt co-operating with the devices of the other belt in pairs and adapted during said movement independent of said belts to grasp and hold a plurality of flax plants between them.

In testimony whereof I have hereunto set my hand.

EMIL PUSCH.